US006005991A

United States Patent [19]
Knasel

[11] Patent Number: 6,005,991
[45] Date of Patent: Dec. 21, 1999

[54] PRINTED CIRCUIT BOARD ASSEMBLY HAVING A FLEXIBLE OPTICAL CIRCUIT AND ASSOCIATED FABRICATION METHOD

[75] Inventor: Donald Lee Knasel, Corning, N.Y.

[73] Assignee: US Conec Ltd, Hickory, N.C.

[21] Appl. No.: 08/979,386

[22] Filed: Nov. 26, 1997

[51] Int. Cl.[6] .................................................. G02B 6/36
[52] U.S. Cl. .............................. 385/14; 385/114; 385/89; 385/92
[58] Field of Search ........................... 385/115–121, 89, 385/59, 14, 114, 147, 92

[56] References Cited

U.S. PATENT DOCUMENTS

| | | | |
|---|---|---|---|
| 3,674,914 | 7/1972 | Burr | 114/261 |
| 3,728,521 | 4/1973 | Borough et al. | 350/96.24 |
| 4,450,623 | 5/1984 | Burr | 29/850 |
| 4,500,389 | 2/1985 | Lassen | 216/18 |
| 4,541,882 | 9/1985 | Lassen | 156/150 |
| 4,544,442 | 10/1985 | Lassen | 216/20 |
| 4,602,318 | 7/1986 | Lassen | 361/792 |
| 4,641,773 | 2/1987 | Morino et al. | 228/1.1 |
| 4,711,026 | 12/1987 | Swiggett et al. | 29/850 |
| 4,732,446 | 3/1988 | Gipson et al. | 385/24 |
| 4,818,322 | 4/1989 | Morino et al. | 29/829 |
| 4,859,807 | 8/1989 | Swiggett et al. | 174/259 |
| 4,972,050 | 11/1990 | Hammond et al. | 174/251 |

(List continued on next page.)

OTHER PUBLICATIONS

W. Delbare, L. Vandam, J. Vandewege, J. Verbeke, M. Fitzgibbon, Electro–optical Board Technology Based On Discrete Wiring, *Circuit World*, vol. 18, No. 3, 1992, pp. 11–16.

P.J. Vett, J. Vandewege, G. De pestel, Q. Tan, F. Migom, J. Van Koetsem, D. Morlion, A. Picard, A. Ambrosy, G. Vendrome, Optical Interconnection Using "Fiber In Board" Technology, *Proc. 21st Eur. Conf. on Opt. Comm. (ECOC'95–Brussels)*, Tu.P.18, 1995, pp. 445–448.

P. Eriksen, K. Gustafsson, M. Niburg, G. Palmskog, M. Robertsson, K. Akermark, The Apollo Demonstrator—New Low–Cost Technologies for Optical Interconnects, *Ericsson Review*, No. 2, 1995, pp. 80–88.

M. Niburg, P. Eriksen, K. Gustafsson, H. Hesselbom, G. Palmskog, M. Robertsson, N. Tan, K. Akermark, A. Djupsöbacka, A Complete Sub–System Of Parallel Optical Interconnects For Telecom Applications, *1996 Electronic Components And Technology Conference*, May 1996, pp. 259–263.

Gary J. Grimes, J.P.C. Markush, Y.M. Wong, P.J. Anthony, W.R. Holland, E.G. Priest, C.J.Sherman, S.R. Peck, D.J. Muehler, C.C. Faudskar, J.S. Nyquist, J.S. Helton, G.L. Sonnier, J.V. Gates, W.K. Honea, J.R. Bortolini, Photonic Packaging Using Laser/Receiver Arrays And Flexible Optical Circuits, *1996 Electronic Components And Technology Conference*, May 1996, pp. 500–505.

(List continued on next page.)

*Primary Examiner*—Hung N. Ngo

[57] ABSTRACT

The printed circuit board assembly includes a printed circuit board having an interior portion upon which a flexible optical circuit is mounted and edge portions surrounding the interior portion. The flexible optical circuit includes a pair of at least partially flexible sheets and a number of optical fibers sandwiched between the flexible sheets. The first ends of the optical fibers extend toward an edge portion of the printed circuit board. In order to conserve space along the edge of the printed circuit board while providing interconnections for each of the optical fibers, a multifiber connector can be mounted upon the respective first ends of a predetermined number of optical fibers. Connectors, such as single fiber connectors, are also mounted to the second ends of the optical fibers. While a number of single fiber connectors occupy more space than a multifiber connector, the single fiber connectors mounted upon the second ends of the optical fibers lie within the less populated interior portion of the printed circuit board, thereby permitting more efficient utilization of the edge portion of the printed circuit board.

20 Claims, 3 Drawing Sheets

OTHER PUBLICATIONS

Q. Tan, G. De pestel, G. Willems, J. Cannaerts, W. Rehm, N. Raiser, K. Vandeputte, A. Van Hove, J. Van Koetsem, A Parallel Optical Link For Intra–and Inter–Rack Interconnections, *1997 Electronic Components And Technology Conferences*, 1997, pp. 234–239.

M.A. Shahid, R.A. Roll and G.J. Shevchuk, Connectorized Optical Fiber Circuits, *Institution Of Electrical Engineers*, 1994, pp. 981–985.

U.S. PATENT DOCUMENTS

| Patent No. | Date | Inventor | Class |
|---|---|---|---|
| 5,155,785 | 10/1992 | Holland et al. | 385/89 |
| 5,204,925 | 4/1993 | Bonanni et al. | 385/76 |
| 5,259,051 | 11/1993 | Burack et al. | 385/76 |
| 5,292,390 | 3/1994 | Burack et al. | 156/176 |
| 5,325,455 | 6/1994 | Henson et al. | 385/89 |
| 5,367,596 | 11/1994 | Chow | 385/116 |
| 5,381,506 | 1/1995 | Amick et al. | 385/114 |
| 5,394,504 | 2/1995 | Burack et al. | 385/139 |
| 5,421,930 | 6/1995 | Holland | 156/166 |
| 5,425,831 | 6/1995 | Grimes et al. | 156/179 |
| 5,469,526 | 11/1995 | Rawlings | 385/135 |
| 5,513,293 | 4/1996 | Holland et al. | 385/135 |
| 5,574,817 | 11/1996 | Henson et al. | 385/114 |
| 5,582,673 | 12/1996 | Burack et al. | 156/285 |
| 5,611,017 | 3/1997 | Lee et al. | 385/114 |

PRINTED CIRCUIT BOARD ASSEMBLY HAVING A FLEXIBLE OPTICAL CIRCUIT AND ASSOCIATED FABRICATION METHOD

FIELD OF THE INVENTION

The present invention relates generally to flexible optical circuits and associated fabrication methods and, more particularly, to printed circuit board assemblies having flexible optical circuits and associated fabrication methods.

BACKGROUND OF THE INVENTION

Many modern telecommunications systems, computer systems and the like transmit and/or process both electrical signals and optical signals. Typically, optical signals are routed via optical fibers over relatively long distances in order to increase the transmission speed and efficiency relative to the propagation of electrical signals. In contrast, much of the signal processing analysis and storage is performed electrically. Thus, these systems must frequently convert optical signals to electrical signals, and electrical signals to optical signals.

Many modern telecommunications systems, computer systems and the like include a number of printed circuit boards or cards which plug into a back plane or mother board. As known to those skilled in the art, the back plane generally provides power as well as a reference voltage or ground to each of the printed circuit boards. In addition, the back plane provides a pathway by which the printed circuit boards communicate with each other.

Signals can be routed along the back plane either electrically or optically. If optical signals are routed along the back plane, the optical signals must generally be converted to electrical signals upon delivery to the printed circuit boards since the printed circuit boards typically include a number of electrical components for processing electrical signals.

In order for the printed circuit boards to plug into the back plane, at least one edge of each printed circuit board includes a number of electrical contacts for establishing electrical connection with corresponding contacts defined by the back plane. In order to establish optical communication with one or more of the optical fibers routed along the back plane, the printed circuit board can also include one or more optoelectrical converters which as either a transmitter or a receiver. For example, an optoelectrical converter receives optical signals and converts those optical signals into corresponding electrical signals prior to routing the electrical signals about the printed circuit board. Instead, the optoelectrical converter could convert electrical signals into corresponding optical signals prior to routing the optical signals along the back plane.

As will be apparent, however, a separate optoelectrical converter is necessary for each optical fiber which is routed to the printed circuit board. If very many optoelectrical converters are mounted along the edge of the printed circuit board, the optoelectrical converters will consume a significant portion of the edge. As a result, the number of other contacts, such as electrical contacts, that can be established at the edge of the printed circuit board will be reduced as the number of optoelectrical converters positioned along the edge of the printed circuit board increases.

Attempts to interconnect optical fibers to the printed circuit board at locations other than the edge of the printed circuit board that plugs into the back plane have disadvantages. Notably, the interconnection of one or more optical fibers to the printed circuit board at a location other than the edge of the printed circuit board which plugs into the back plane will generally hinder the insertion and removal of the printed circuit board since the optical fibers must typically be separately handled to prevent tangling. In this regard, fiber management is becoming of ever increasing importance to a system designer as the number and lengths of the optical fibers increase. As a result, system designers generally strive to control the routing of the optical fibers so as to prevent the optical fibers from interfering with other components or from otherwise causing congestion.

SUMMARY OF THE INVENTION

It is therefore an object of the present invention to provide a printed circuit board assembly which communicates with one or more optical fibers in a manner which makes efficient use of the edge portions of the printed circuit board.

It is another object of the present invention to provide a printed circuit board assembly which communicates with one or more optical fibers that are controllably routed along the printed circuit board.

It is further an object of the present invention to provide an improved method of fabricating a flexible optical circuit.

These and other objects are provided, according to the present invention, by a printed circuit board assembly having a flexible optical circuit and an associated method of fabricating the flexible optical circuit. The printed circuit board assembly includes a printed circuit board having an interior portion upon which the flexible optical circuit is mounted and edge portions surrounding the interior portion. The flexible optical circuit includes a pair of at least partially flexible sheets and a number of optical fibers disposed between the at least partially flexible sheets such that the first and second ends of each of the optical fibers extend outwardly beyond the pair of at least partially flexible sheets. The first ends of the optical fibers extend toward an edge portion of the printed circuit board. In order to conserve space along the edge of the printed circuit board while providing interconnections for each of the optical fibers, a multifiber connector can be mounted upon the respective first ends of a predetermined number of optical fibers. However, the second ends of the optical fibers lie within the interior portion of the printed circuit board which is generally less populated and, therefore, less valuable than the edge portions of the printed circuit board.

Each of the optical fibers of the flexible optical circuit includes a core and cladding, a coating layer surrounding the core and cladding, and a buffer layer surrounding portions of the coating layer. According to one advantageous embodiment, the buffer layer and the coating layer surround the core and cladding proximate the second ends of the optical fibers. In contrast, the first ends of the optical fibers are free of at least the buffer layer and, more preferably, both the buffer layer and the coating layer. In order to provide strain relief as well as to enhance the other mechanical properties of the optical fibers, the buffer and coating layers advantageously extend from a location proximate the second ends of the optical fibers and outward of the edge of flexible sheets to a location between the at least partially flexible sheets. In one embodiment, the buffer and coating layers terminate at a location at least 2 mm inward of an edge of the at least partially flexible sheets.

The printed circuit board assembly can also include a number of second connectors mounted upon the respective second ends of the optical fibers. The second connectors are typically single fiber connectors mounted upon the second end of a respective optical fiber. According to the present invention, however, the second connectors can be multifiber connectors so long as the second connector is mounted upon the respective second ends of a number of optical fibers that is less than the predetermined number of optical fibers upon which the multifiber connector is mounted. In this fashion, the optical fibers can be fanned out, typically to a number of spaced apart single fiber connectors, without requiring each of the single fiber connectors to be mounted along an edge portion of the printed circuit board, thereby making more efficient utilization of the edge portion of the printed circuit board.

The printed circuit board assembly can also include a number of optoelectrical converters mounted upon the printed circuit board and disposed in optical communication with the second ends of respective ones of the optical fibers. Thus, the optical signals can be converted to corresponding electrical signals for subsequent processing by the printed circuit board assembly. In this regard, the printed circuit board assembly can include electrical circuitry mounted upon the printed circuit board and disposed in electrical communication with the optoelectrical converters.

In order to make even more efficient utilization of the interior portion of the printed circuit board, the printed circuit board assembly can include a number of flexible optical circuits disposed upon the interior portion of the printed circuit board. For example, at least one flexible optical circuit can be disposed upon the interior portion of each of the opposed surfaces of the printed circuit board.

In order to efficiently fabricate the flexible optical circuit of the present invention, a method has also been developed which preconnectorizes the second ends of a plurality of optical fibers prior to disposing the optical fibers between the pair of at least partially flexible sheets. In this manner, the predetermined optical fibers can be tested to ensure that the connectors have been properly mounted prior to bonding or otherwise securing the optical fibers between the at least partially flexible sheets. If one or more of the connectors are improperly mounted, the optical fiber can be scrapped or reworked and another properly connectorized optical fiber can be disposed between the at least partially flexible sheets. In this manner, the reliability of the resulting flexible optical circuit is significantly increased.

Therefore, the printed circuit board assembly of the present invention effectively interconnects one or more optical fibers to the appropriate components upon the printed circuit board, while reducing the amount of space required along the edge portion of the printed circuit board for establishing optical communication with optical fibers routed along a back plane. As a result, an increased number of connections, both electrical and mechanical, can be established along the edge portion of the printed circuit board. In addition, by sandwiching the optical fibers that extend from an edge portion of the printed circuit board to an interior portion of the printed circuit board between a pair of at least partially flexible sheets, the printed circuit board assembly effectively manages the optical fibers to prevent splaying or other undesirable movement of the optical fibers.

By preconnectorizing the optical fibers prior to securing the optical fibers between the pair of at least partially flexible sheets, the method of the present invention can more reliably fabricate a fully functional flexible optical circuit. In this regard, the preconnectorized optical fibers can be tested for proper performance prior to securing the optical fibers between the pair of at least partially flexible sheets, thereby permitting relatively easy replacement of any preconnectorized optical fiber that proves to be defective without scrapping an entire flexible optical circuit.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
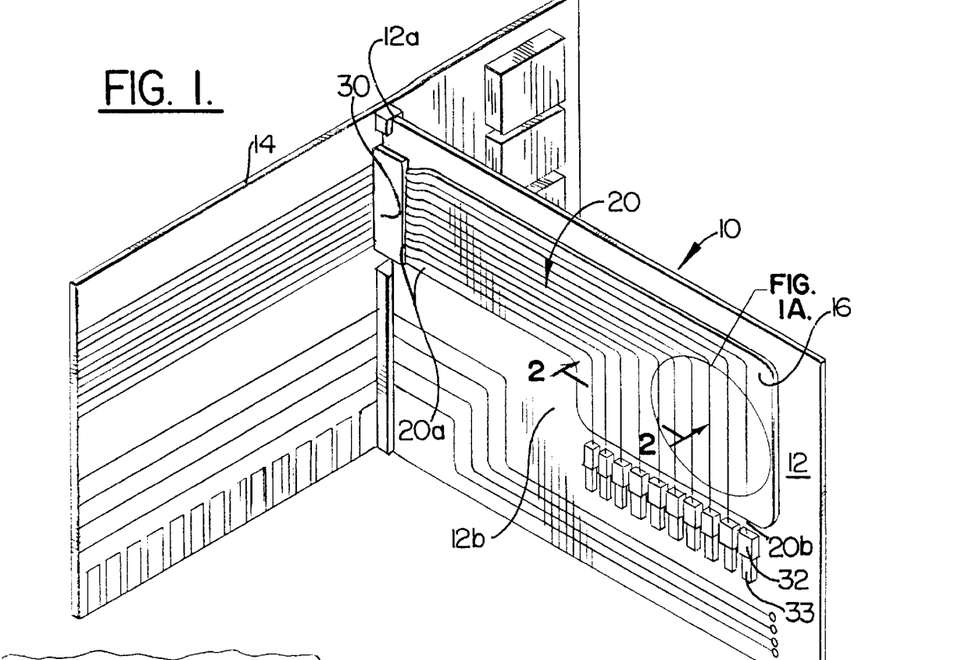
FIG. 1 is a perspective view of a printed circuit board assembly that is plugged into a back plane of the present invention.

Referring now to FIG. 1, a printed circuit board assembly 10 according to one advantageous embodiment of the present invention is illustrated. The printed circuit board assembly includes a printed circuit board 12 that is illustratively plugged into a back plane 14 or motherboard along a first edge 12a thereof. The printed circuit board generally includes a number of electrical contacts or connections along the first edge for making electrical contact with the corresponding connectors on the back plane. According to the present invention, the printed circuit board assembly also has a connector for establishing optical communication with one or more optical fibers routed along the back plane, as described hereinbelow.

Figures 1A, 2A:
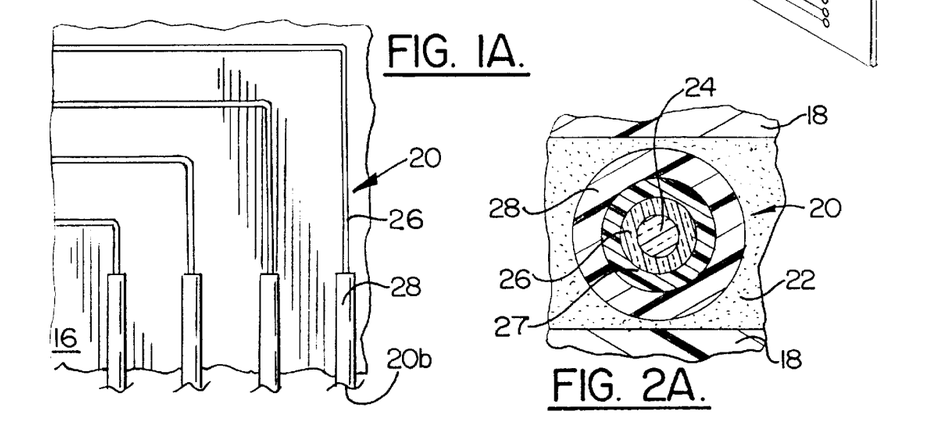
FIG. 1A is an enlarged plan view of a portion of the printed circuit board assembly of FIG. 1.
FIG. 2A is an enlarged cross-sectional view of an optical fiber bonded between a pair of at least partially flexible sheets.
Figure 2:
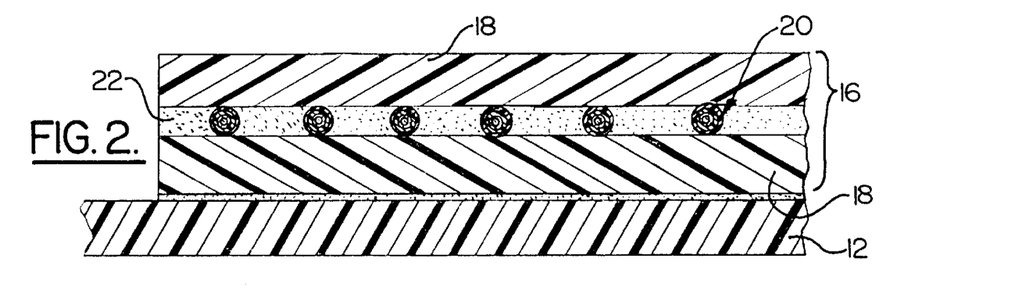
FIG. 2 is cross-sectional view of the printed circuit board assembly of FIG. 1 taken along lines 2—2.

According to the present invention, the printed circuit board assembly 10 includes a flexible optical circuit 16 disposed upon an interior portion 12b of the printed circuit board 12, as shown in FIG. 2. As shown in FIGS. 2 and 2A, the flexible optical circuit includes a pair of at least partially flexible sheets 18. According to one advantageous embodiment, the at least partially flexible sheets are formed of MYLAR® OR KAPTON® films. While the flexible sheets can be formed of a variety of materials, both flexible sheets preferably have the same mechanical properties and oftentimes are formed of the same material. The at least partially flexible sheets can have a variety of thicknesses. According to one advantageous embodiment, however, the at least partially flexible sheets are formed of MYLAR films having a thickness of 6 mils. The thickness of the sheets can be varied, however, in order to modify the flexibility of the flexible optical circuit since the flexibility of the flexible optical circuit generally varies in an inverse manner with respect to the thickness of the sheets.

The flexible optical circuit 16 also includes a number of optical fibers 20 secured between the at least partially flexible sheets 18, typically by means of an adhesive 22 and, more preferably, by means of a pressure sensitive adhesive, such as VHB adhesive supplied by 3M. The optical fibers extend between respective first and second ends 20a and 20b. As shown in FIG. 1, the flexible optical circuit is disposed upon the interior portion 12b of the printed circuit board 12 such that the first ends of the optical fibers extend toward an edge portion 12a of the printed circuit board, while the second ends of the optical fibers lie within the interior portion of the printed circuit board. However, both the first and second ends of the optical fibers extend outwardly beyond the pair of at least partially flexible sheets. Although not illustrated, the at least partially flexible sheets can include a number interconnected fingers or strips, each of which encapsulates at least one optical fiber, without departing from the spirit and scope of the present invention.

The flexible optical circuit 16 can be mounted to the printed circuit board 12 in a variety of manners. For example, the flexible optical circuit can be mounted to the printed circuit board by means of hold down clips, mechanical standoffs or adhesive. Alternatively, the flexible optical circuit can be disposed within a rigid tray that is, in turn, mounted to the printed circuit board, such as by means of mechanical standoffs. Still further, the flexible optical circuit can be supported relative to the printed circuit board by means of the optical connectors mounted on the opposed ends of the optical fibers 20.

As shown in cross-section in FIGS. 2 and 2A, each of the optical fibers 20 of the flexible optical circuit 16 preferably includes a core 24, a cladding layer 26 surrounding the core, a fiber coating layer 27 surrounding the cladding layer and a buffer layer 28 surrounding portions of the coating layer. As known to those skilled in the art, the core and cladding layer are generally formed of glass, while the fiber coating layer and the buffer layer (sometimes termed the tight buffer and the composite buffer, respectively) are generally formed of plastic. In one common embodiment, the core and cladding layer have a diameter of 125 μm, the coating layer has a diameter of 250 μm, and the buffer layer has a diameter of 900 μm, for example. According to one advantageous embodiment shown in FIG. 1A, the buffer layer and the coating layer surround the cladding layer proximate the second ends 20b of the optical fibers. In contrast, the first ends 20a of the optical fibers are free of at least the buffer layer and, most commonly, both the buffer layer and the coating layer in order to permit a multi-fiber connector to be mounted to the first ends of the optical fibers. In order to provide strain relief as well as to enhance the other mechanical properties of the optical fibers, the buffer layer and the coating layer advantageously extend from a location proximate the second ends of the optical fibers and outward of the edge of the flexible sheets 18 to a location between the at least partially flexible sheets. In one embodiment, the buffer layer and the coating layer terminate at a location at least 2 mm inward of an edge of the at least partially flexible sheets. As such, the flexible sheets provide strain relief for the optical fibers, particularly at the location between the flexible sheets at which the buffer layer and the coating layer terminates.

The flexible optical circuit 16 also includes a multifiber connector 30, such as an MTP connector or the like, mounted upon the respective first ends 20a of a predetermined number of optical fibers 20. For example, the multifiber connector can be an MT connector as described in U.S. Pat. No. 5,214,730 which issued May 25, 1993 to Shinji Nagasawa, et al. The multifiber connector can be mounted upon the first ends of two or more optical fibers and, most commonly, is mounted upon the first ends of two, four, eight, twelve or sixteen optical fibers. The portion of the flexible optical circuit from which the first ends of the optical fibers extend is generally inserted into a cavity defined by the rear portion of the multifiber connector in the same fashion that a multifiber connector is mounted upon a ribbon of optical fiber. As such, the first ends of the optical fibers need not include the coating and buffer layers since the flexible optical circuit itself can provide strain relief for the optical fibers. Within the multifiber connector, however, the first ends of the optical fibers extend beyond the at least partially flexible sheets and are epoxied within the connector body.

As shown in FIG. 1, the multifiber connector 30 extends to and is mounted along an edge portion 12a of the printed circuit board 12. As such, the multifiber connector can mate with a corresponding multifiber connector of the back plane 14 upon plugging the printed circuit board assembly 10 into the back plane such that optical communications is established with a number of optical fibers that are routed along the back plane and that may provide an optical pathway between printed circuit boards, for example.

Figure 3:
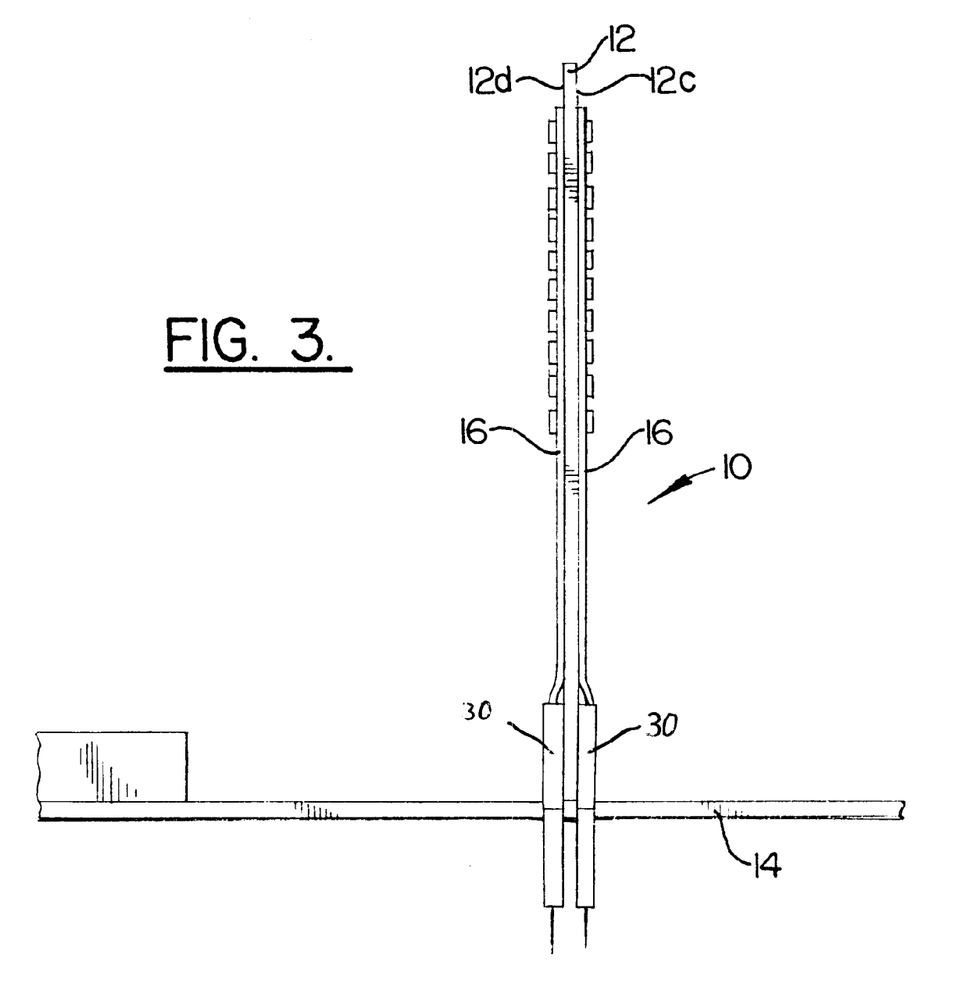
FIG. 3 is a top plan view of a printed circuit board assembly of another embodiment of the present invention which includes flexible optical circuits disposed on both major surfaces thereof.

As shown in FIG. 3, the back plane 14 may define an aperture through which the multifiber connector 30 extends. As such, the multifiber connector can mate with another multifiber connector to support optical communications with one or more optical fibers. Alternatively, the flexible optical circuit 16 can be positioned such that the multifiber connector extends to other edges, such as the front edge, of the printed circuit board 12, if so desired.

As also shown in FIG. 1, the flexible optical circuit 16 generally further includes a number of second connectors 32 mounted upon the respective second ends 20b of the optical fibers 20. While the second connectors can also be multifiber connectors, the second-connectors are generally single fiber connectors, such as SC connectors or the like, which are mounted upon the second end of a respective optical fiber. In the embodiment in which the second connectors are multifiber connectors, however, the second connectors are mounted upon the second ends of a fewer number of optical fibers than the multifiber connector 30 that is mounted to the first ends of a predetermined number of optical fibers. For example, if the multifiber connector that is mounted upon the first ends with the optical fibers is adapted to mount upon the first ends of eight optical fibers, the second connectors can include multifiber connectors that are adapted to be mounted upon the second ends of either two or four optical fibers, if so desired.

According to the embodiment of the present invention shown in FIG. 1, the multifiber connector 30 mounted upon the first ends 20a of the respective optical fibers 20 can establish optical communications with corresponding optical fibers routed along the back plane 14. By establishing optical communications by means of a multifiber connector, the flexible optical circuit 16 occupies much less space along the edge portion 12a of the printed circuit board 12 than conventional designs that include a number of single fiber connectors or optoelectrical converters mounted along the edge portion of the printed circuit board. Instead of being spaced apart along the edge portion of the printed circuit board, the optical fibers of the flexible optical circuit fan out from the multifiber connector in a direction extending toward the second ends 20b of the respective optical fibers. The second ends of the plurality of optical fibers can therefore establish optical communications with a variety of optical and/or electrooptical devices mounted within the interior portion 12b of the printed circuit board. As known to those skilled in the art, the interior portion of a printed circuit board generally has much more space for mounting components or otherwise accommodating connectors than does the edge portion of the printed circuit board. Thus, the printed circuit board assembly 10 of the present invention makes more efficient use of the interior portion of the printed circuit board which is less in demand than the edge portions, while reducing the space along the edge portions that is required for establishing optical communications with optical fibers routed along the back plane.

In one embodiment, the printed circuit board assembly 10 includes a number of optoelectrical convertors 33 such as the HFBR-S203 or HFBR-S205 optoelectrical transceivers commercially available from Hewlett Packard. The optoelectrical converters are mounted upon the printed circuit board 12 and are disposed in optical communication with the second ends 20b of respective ones of the optical fibers 20. As such, the optical signals propagating along the respective optical fibers are converted into corresponding electrical signals for subsequent routing and/or processing by the various electrical components and other electrical circuitry of the printed circuit board assembly. Likewise, electrical signals can be converted to corresponding optical signals for subsequent introduction into and propagation first along an optical fiber extending through the flexible optical circuit 16 and secondly along a corresponding optical fiber routed along the back plane 14. Thus, optoelectrical converters generally provide for bi-directional optical/electrical conversion.

Although a connector 32 is mounted upon the second end 20b of each optical fiber 20 in the embodiment of FIG. 1, the second end of each optical fiber need not be connectorized. Instead, the second end of one or more optical fibers can be aligned with respective optical fibers that are attached or welded to the printed circuit board 12. Although not shown, the optical fibers are generally aligned with one or more lenses.

The flexible optical circuit 16 can be disposed upon or mounted to the interior portion 12b of the printed circuit board 12 in a variety of fashions. For example, the flexible optical circuit can be attached to the printed circuit board by means of hold down clips, adhesive or the like. Alternatively, the flexible optical circuit can be suspended over the printed circuit board by mechanical standoffs or the like.

In addition, although the printed circuit board assembly 10 described hereinabove includes only a single flexible optical circuit 16, the printed circuit board assembly can include a plurality of flexible optical circuits disposed upon interior portions 12b of the printed circuit board 12. In this regard, a printed circuit board generally has first and second opposed surfaces 12c and 12d. As such, the printed circuit board assembly can include at least one flexible optical circuit disposed upon the interior portion of each of the first and second opposed surfaces as shown in FIG. 3. Alternatively, multiple flexible optical circuits can be stacked one upon another on the same side of a printed circuit board.

Therefore, the printed circuit board assembly 10 of the present invention effectively interconnects one or more optical fibers 20 to the appropriate components upon the printed circuit board 12, while reducing the amount of space required along the edge portion 12a of the printed circuit board for establishing optical communication with optical fibers routed along a back plane 14. As a result, an increased number of connections, both electrical and mechanical, can be established along the edge portion of the printed circuit board. In addition, by sandwiching the optical fibers that extend from an edge portion of the printed circuit board to an interior portion 12b of the printed circuit board between a pair of at least partially flexible sheets 18, the printed circuit board assembly effectively manages the optical fibers to prevent splaying or other undesirable movement of the optical fibers.

Figure 4:
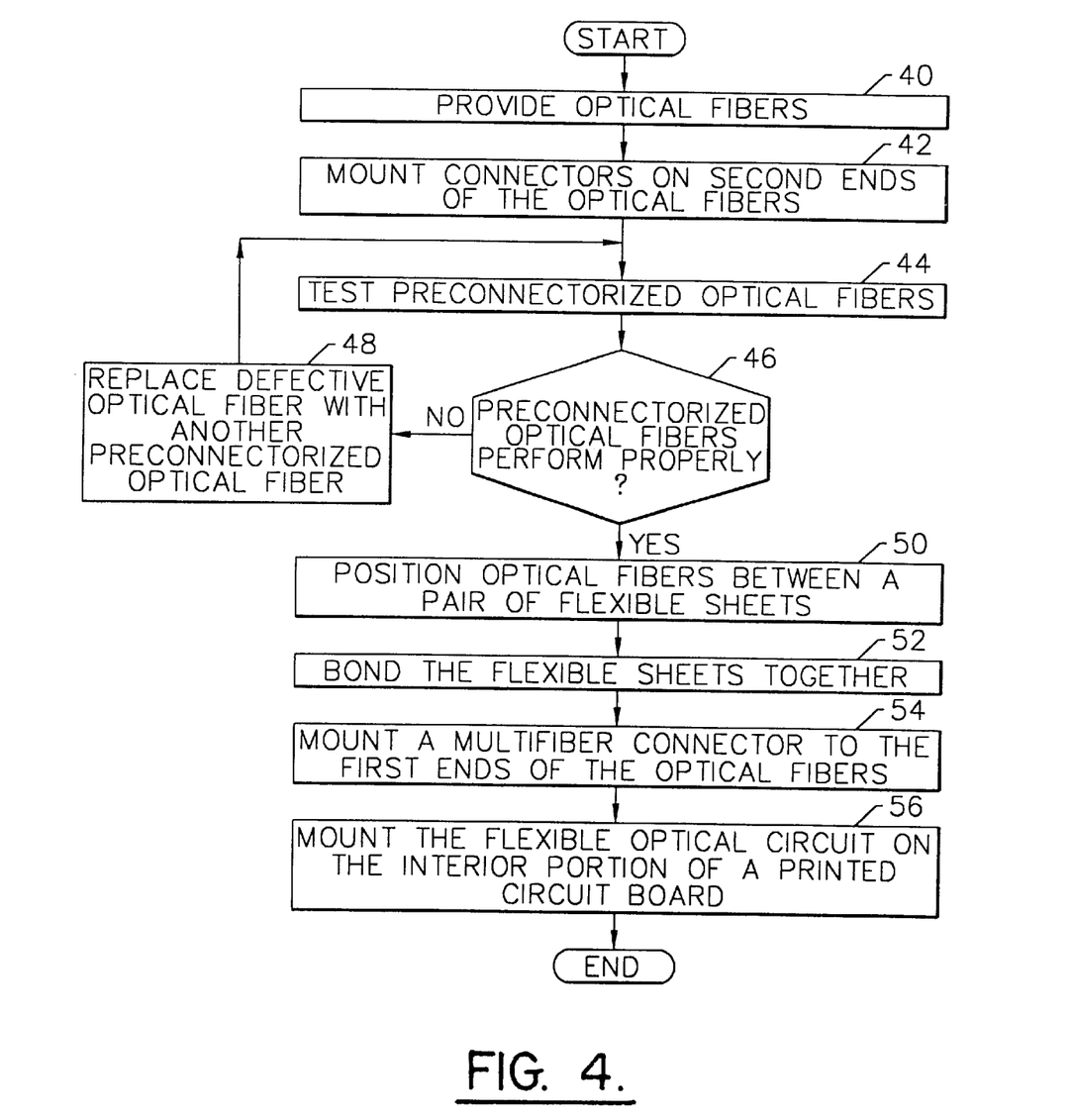
FIG. 4 is a flow chart illustrating the operations performed during the fabrication of a flexible optical circuit according to one advantageous embodiment of the present invention.

Although the flexible optical circuit 16 of the above described printed circuit board assembly 10 described above can be fabricated in a variety of manners, one particularly advantageous method for fabricating a flexible optical circuit is depicted in FIG. 4. As shown in block 40, a number of optical fibers 20 extending between respective first and second ends 20a and 20b are initially provided. As described above, the optical fibers preferably include a coating layer 27 and a buffer layer 28 extending from proximate the second ends 20b of the optical fibers to medial portions of the optical fibers.

As shown in block 42, one end of the optical fibers 20 is then preconnectorized. For example, connectors 32 can be mounted upon the respective second ends 20b of the optical fibers. Although multifiber connectors can be mounted on the respective second ends of the optical fibers as described above, the method of the present invention is particularly advantageous in instances in which single fiber connectors are mounted upon the second ends of the respective optical fibers since a greater number of connections must be properly established for the resulting flexible optical circuit 16 to function properly.

As shown in blocks 44 and 46, the preconnectorized optical fibers 20 are then tested to determine if the connectors 32 are properly mounted upon the respective second ends 20b of the optical fibers. In this regard, light of a known intensity can be introduced at one end of each optical fiber and the resulting light intensity emanating from the other end of the optical fiber can be measured and compared to the light of known intensity to ensure that the connectors mounted upon the second ends of the optical fibers do not disadvantageously attenuate the optical signals propagating therethrough. If a connector appears to have been improperly mounted upon any one of the optical fibers, such as by significantly attenuating the test optical signal, the defective optical fiber can be replaced with another preconnectorized optical fiber that has also been tested to ensure proper performance. See block 48 of FIG. 4.

Once the preconnectorized optical fibers 20 have been tested to ensure that the connectors 32 have been properly mounted upon their respective second ends 20b, the optical fibers are disposed between a pair of at least partially flexible sheets 18 as shown in block 50. The optical fibers are disposed between the at least partially flexible sheets such that the first ends 20a and the preconnectorized second ends of the optical fibers extend outwardly beyond the pair of at least partially flexible sheets. As shown in FIG. 1A, however, the optical fibers are positioned between the pair of at least partially flexible sheets such that the coating layer 27 and the buffer layer 28 extend from a location proximate the second ends of the optical fibers and outward of the edge of the flexible sheets to a medial portion of the optical fibers at a location between the at least partially flexible sheets. In one embodiment, the optical fibers are positioned such that the coating and buffer layers terminate at a location at least 2 mm inward of an edge of the at least partially flexible sheets such that the flexible sheets will provide strain relief for the optical fibers.

While disposing the optical fibers 20 between the pair of at least partially flexible sheets 18, the optical fibers are positioned such that the optical fibers fan out in a direction extending from the first ends 20a to the preconnectorized second ends 20b of the optical fibers. As shown in block 52, the at least partially flexible sheets can thereafter be bonded, such as by means of a pressure sensitive adhesive, so as to secure the properly positioned optical fibers therebetween.

According to one advantageous embodiment, a multifiber connector 30 is then mounted upon the first ends 20a of the plurality of optical fibers 20, thereby creating a flexible optical circuit 16 as shown in FIGS. 1, for example. See block 54 of FIG. 4. The flexible optical circuit can then be mounted to the interior portion 12b of a printed circuit board 12 such that the multifiber connector extends toward an edge portion 12a of the printed circuit board, while the preconnectorized second ends 20b of the optical fibers lie within the interior portion of the printed circuit board as shown in FIG. 1 and as described hereinabove. See block 56.

By preconnectorizing the optical fibers 20 prior to securing the optical fibers between the pair of at least partially flexible sheets 18, the method of the present invention can more reliably fabricate a fully functional flexible optical circuit 16. In this regard, the preconnectorized optical fibers can be tested for proper performance prior to securing the optical fibers between the pair of at least partially flexible sheets, thereby permitting relatively easy replacement of any preconnectorized optical fiber that proves to be defective without scrapping an entire flexible optical circuit. As a result, the yield of the fabrication method of the present invention should be improved relative to conventional methods for fabricating flexible optical circuits that mount the connectors on end portions of the optical fibers only after bonding the optical fibers between a pair of face sheets, thereby requiring the entire assembly to be scrapped or reworked if one of the connectors is mounted improperly.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a flexible optical circuit comprising the steps of:
   providing a plurality of optical fibers extending between respective first and second ends;
   mounting connectors upon respective second ends of the plurality of optical fibers; and
   disposing the plurality of optical fibers between a pair of at least partially flexible sheets such that the first ends and the preconnectorized second ends of the plurality of optical fibers extend outwardly beyond the pair of at least partially flexible sheets.

2. A method of fabricating a flexible optical circuit comprising the steps of:
   providing a plurality of optical fibers extending between respective first and second ends;
   mounting connectors upon respective second ends of the plurality of optical fibers; and
   disposing the plurality of optical fibers between a pair of at least partially flexible sheets such that the first ends and the preconnectorized second ends of the plurality of optical fibers extend outwardly beyond the pair of at least partially flexible sheets, and further comprising the step of testing the plurality of optical fibers following said mounting step to determine if the connectors are properly mounted upon the respective second ends of the optical fibers prior to disposing the plurality of preconnectorized optical fibers between the pair of at least partially flexible sheets.

3. A method of fabricating a flexible optical circuit comprising the steps of:
   providing a plurality of optical fibers extending between respective first and second ends;
   mounting connectors upon respective second ends of the plurality of optical fibers; and
   disposing the plurality of optical fibers between a pair of at least partially flexible sheets such that the first ends and the preconnectorized second ends of the plurality of optical fibers extend outwardly beyond the pair of at least partially flexible sheets, wherein said disposing step comprises positioning the plurality of optical fibers between the pair of at least partially flexible sheets such that the plurality of optical fibers fan out in a direction extending from the first ends to the preconnectorized second ends of the plurality of optical fibers.

4. A method according to claim 3 further comprising the steps of:
   mounting a multifiber connector upon the first ends of the plurality of optical fibers; and
   mounting the flexible optical circuit to the interior portion of a printed circuit board such that the multifiber connector extends toward an edge portion of the printed circuit board while the preconnectorized second ends of the plurality of optical fibers lie within the interior portion of the printed circuit board.

5. A method of fabricating a flexible optical circuit comprising the steps of:
   providing a plurality of optical fibers extending between respective first and second ends;
   mounting connectors upon respective second ends of the plurality of optical fibers; and
   disposing the plurality of optical fibers between a pair of at least partially flexible sheets such that the first ends and the preconnectorized second ends of the plurality of optical fibers extend outwardly beyond the pair of at least partially flexible sheets, wherein said providing step comprises providing a plurality of optical fibers comprising a core, a cladding layer surrounding said core, and a buffer layer surrounding the cladding layer proximate the second ends of said optical fibers, wherein the first ends of said optical fibers are free of said buffer layer, and wherein said disposing step comprises disposing the plurality of optical fibers between the pair of at least partially flexible sheets such that the buffer layer terminates at a location along the optical fibers between the at least partially flexible sheets.

6. A method according to claim 5 wherein said providing step comprises providing a plurality of optical fibers which further comprise a coating layer between the cladding layer and the buffer layer proximate the second ends of the optical fibers, wherein the first ends of said optical fibers are free of the coating layer, and wherein said disposing step comprises disposing the plurality of optical fibers between the pair of at least partially flexible sheets such that both the coating layer and the buffer layer terminate at a location along the optical fibers between the at least partially flexible sheets.

7. A flexible optical circuit comprising:

a pair of at least partially flexible sheets;

a plurality of optical fibers extending between respective first and second ends, said plurality of optical fibers disposed between said pair of at least partially flexible sheets such that the first and second ends of said plurality of optical fibers extend outwardly beyond said pair of at least partially flexible sheets, wherein said optical fibers comprise:

a core;

a cladding layer surrounding said core; and a buffer layer surrounding the cladding layer proximate the second ends of said optical fibers, wherein the first ends of said optical fibers are free of said buffer layer such that said buffer layer terminates at a location along said optical fibers between said at least partially flexible sheets;

a multifiber connector mounted upon the respective first ends of a predetermined number of said plurality of optical fibers; and a plurality of second connectors mounted upon the respective second ends of said plurality of optical fibers, each of said second connectors mounted upon the respective second ends of less than the predetermined number of optical fibers.

8. A flexible optical circuit according to claim 7 wherein said optical fibers further comprise a coating layer disposed between said cladding layer and said buffer layer proximate the second ends of said optical fibers, wherein the first ends of said optical fibers are free of both said coating layer and said buffer layer terminate at a location along said optical fibers between said at least partially flexible sheets.

9. A flexible optical circuit according to claim 8 wherein both said coating layer and said buffer layer terminate at a location at least 2 mm inward of an edge of said at least partially flexible sheets.

10. A flexible optical circuit according to claim 7 wherein said plurality of second connectors comprise a plurality of single fiber connectors mounted upon the second ends of respective optical fibers.

11. A flexible optical circuit according to claim 7 further comprising an adhesive disposed between said at least partially flexible sheets to secure said plurality of optical fibers therebetween.

12. A printed circuit board assembly comprising:

a printed circuit board having an interior portion and edge portions surrounding the interior portion; and a flexible optical circuit disposed upon the interior portion of said printed circuit board, said flexible optical circuit comprising:

a pair of at least partially flexible sheets;

a plurality of optical fibers extending between respective first and second ends wherein the first ends extend toward an edge portion of said printed circuit board and the second ends lie within the interior portion of said printed circuit board, said plurality of optical fibers disposed between said pair of at least partially flexible sheets such that the first and second ends of said plurality of optical fibers extend outwardly beyond said pair of at least partially flexible sheets, said optical fibers comprising a core, a cladding layer surrounding said core, and a buffer layer surrounding the cladding layer proximate the second ends of said optical fibers, wherein the first ends of said optical fibers are free of said buffer layer such that said buffer layer terminates at a location along said optical fibers between said at least partially flexible sheets; and a multifiber connector mounted upon the respective first ends of said plurality of optical fibers, said multifiber connector extending to an edge portion of said printed circuit board.

13. A printed circuit board assembly according to claim 12 wherein said optical fibers further comprise a coating layer disposed between said cladding layer and said buffer layer proximate the second ends of said optical fibers, wherein the first ends of said optical fibers are free of both said coating layer and said buffer layer terminate at a location along said optical fibers between said at least partially flexible sheets.

14. A printed circuit board assembly according to claim 13 wherein both said coating layer and said buffer layer terminate at a location at least 2 mm inward of an edge of said at least partially flexible sheets.

15. A printed circuit board assembly according to claim 12 wherein said multifiber connector is mounted upon the respective first ends of a predetermined number of optical fibers, and wherein the printed circuit board assembly further comprises a plurality of second connectors mounted upon the respective second ends of said plurality of optical fibers, each of said second connectors mounted upon the respective second ends of less than the predetermined number of optical fibers.

16. A printed circuit board assembly according to claim 15 wherein said plurality of second connectors comprise a plurality of single fiber connectors mounted upon the second ends of respective optical fibers.

17. A printed circuit board assembly according to claim 12 further comprising a plurality of optoelectrical converters mounted upon said printed circuit board and disposed in optical communication with the second ends of respective ones of said optical fibers.

18. A printed circuit board assembly according to claim 17 further comprising electrical circuitry mounted upon said printed circuit board and disposed in electrical communication with said plurality of optoelectrical converters.

19. A printed circuit board assembly according to claim 12 further comprising a plurality of flexible optical circuits disposed upon the interior portion of said printed circuit board.

20. A printed circuit board assembly according to claim 19 wherein said printed circuit board has first and second opposed surfaces, and wherein at least one flexible optical circuit is disposed upon the interior portion of each of the first and second opposed surfaces of said printed circuit board.

* * * * *